United States Patent
Kameyama et al.

(10) Patent No.: US 11,575,868 B2
(45) Date of Patent: Feb. 7, 2023

(54) PHOTOELECTRIC CONVERSION APPARATUS, METHOD OF DRIVING PHOTOELECTRIC CONVERSION APPARATUS, PHOTOELECTRIC CONVERSION SYSTEM, AND MOVING BODY

(71) Applicant: CANON KABUSHIKI KAISHA, Tokyo (JP)

(72) Inventors: Hiroaki Kameyama, Kawasaki (JP); Seiichirou Sakai, Yokohama (JP); Kazuo Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 16/892,044

(22) Filed: Jun. 3, 2020

(65) Prior Publication Data
US 2020/0389638 A1 Dec. 10, 2020

(30) Foreign Application Priority Data
Jun. 7, 2019 (JP) .............................. JP2019-107370

(51) Int. Cl.
| | |
|---|---|
| *H04N 5/359* | (2011.01) |
| *H04N 5/374* | (2011.01) |
| *H04N 5/378* | (2011.01) |
| *H04N 13/122* | (2018.01) |
| *B60R 11/04* | (2006.01) |
| *B60K 35/00* | (2006.01) |
| *H04N 13/225* | (2018.01) |

(52) U.S. Cl.
CPC .......... *H04N 13/122* (2018.05); *B60K 35/00* (2013.01); *B60R 11/04* (2013.01); *H04N 13/225* (2018.05); *B60K 2370/176* (2019.05); *B60K 2370/179* (2019.05); *B60K 2370/21* (2019.05); *B60R 2300/301* (2013.01)

(58) Field of Classification Search
CPC ..................................................... H04N 5/378
See application file for complete search history.

(56) References Cited

U.S. PATENT DOCUMENTS

| | | | |
|---|---|---|---|
| 2005/0225653 A1* | 10/2005 | Masuyama | H04N 5/3598 348/241 |
| 2009/0051801 A1 | 2/2009 | Mishina | |
| 2017/0150075 A1* | 5/2017 | Hiyama | H01L 27/14612 |

FOREIGN PATENT DOCUMENTS

| | | |
|---|---|---|
| JP | 2009-49740 A | 3/2009 |
| JP | 2016-19157 A | 2/2016 |
| JP | 2016-219993 A | 12/2016 |
| JP | 2018-148295 A | 9/2018 |

\* cited by examiner

*Primary Examiner* — Nan-Ying Yang
(74) *Attorney, Agent, or Firm* — Canon U.S.A., Inc. IP Division

(57) ABSTRACT

A photoelectric conversion apparatus includes a control unit configured to change a voltage of an input node from a first voltage toward a predetermined voltage during a predetermined time period after the voltage of the input node changes to the first voltage and before the voltage of the input node changes to a second voltage. A method of driving the photoelectric conversion apparatus includes controlling changing of the voltage of the input node from the first voltage toward the predetermined voltage during the predetermined time period.

23 Claims, 11 Drawing Sheets

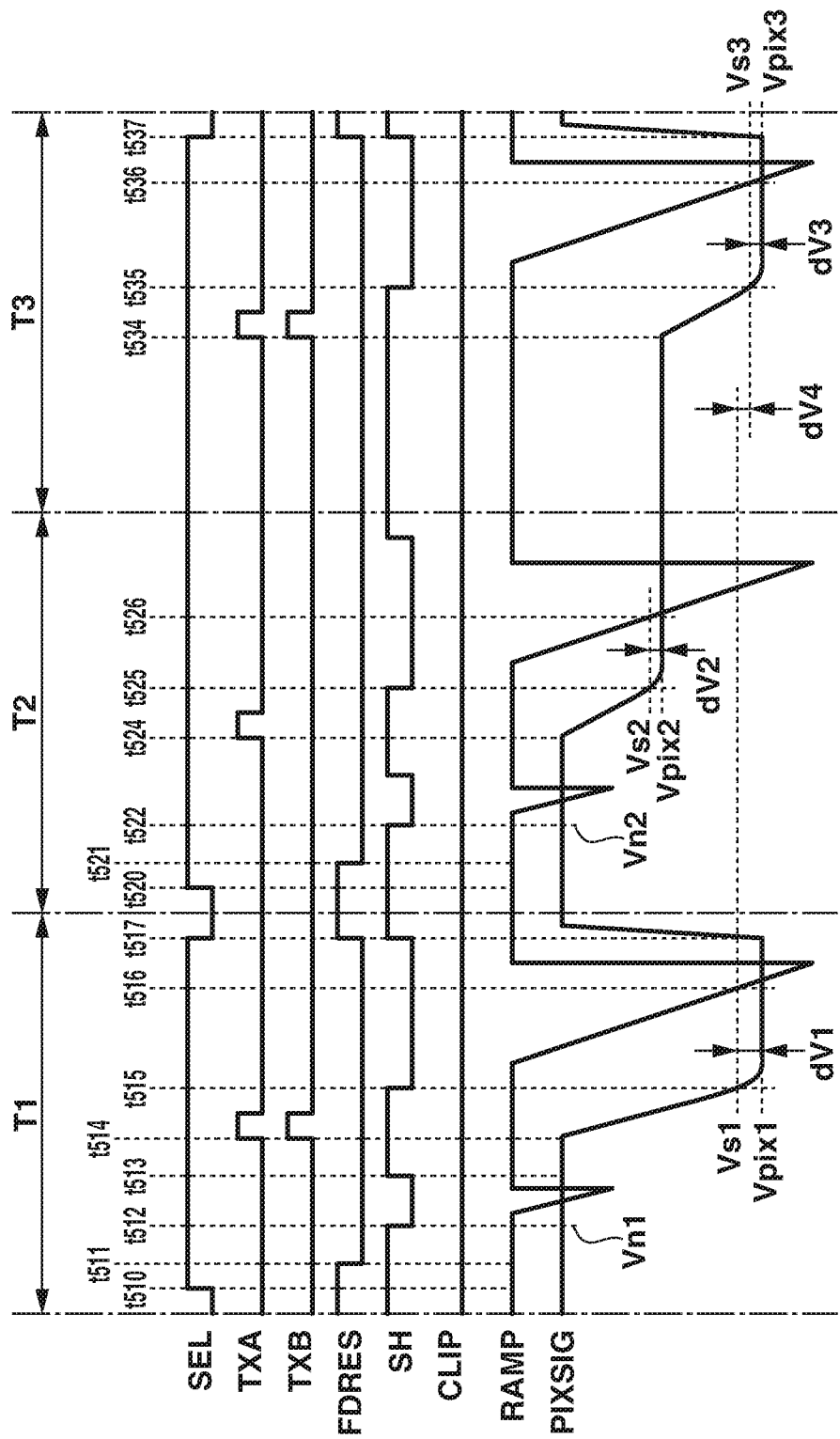

PHOTOELECTRIC CONVERSION APPARATUS, METHOD OF DRIVING PHOTOELECTRIC CONVERSION APPARATUS, PHOTOELECTRIC CONVERSION SYSTEM, AND MOVING BODY

BACKGROUND OF THE INVENTION

Field of the Invention

The present invention relates to photoelectric conversion apparatuses, methods of driving a photoelectric conversion apparatus, photoelectric conversion systems, and moving bodies.

Description of the Related Art

In recent years, there have been demands for a photoelectric conversion apparatus, such as an image capturing apparatus, distance measurement apparatus, and photometric apparatus, with various functions.

Japanese Patent Application Laid-Open No. 2016-219993 discusses an image capturing apparatus that includes a plurality of pixels. Some pixels (hereinafter, referred to as "first pixels") among the plurality of pixels output the following signals to a signal line: a signal based on an electric charge of only some photoelectric conversion portions among a plurality of photoelectric conversion portions (hereinafter, referred to as a "first signal"), and a signal corresponding to an electric charge obtained by adding up electric charges of the plurality of photoelectric conversion portions (hereinafter, referred to as a "second signal"). Other pixels (hereinafter, referred to as "second pixels") among the plurality of pixels output the second signal to the signal line.

According to Japanese Patent Application Laid-Open No. 2016-219993, a voltage of the signal line is a voltage that corresponds to the first signal, before the first pixel outputs the second signal to the signal line. On the other hand, the voltage of the signal line is a noise-level voltage, before the second pixel outputs the second signal to the signal line. In other words, there is a difference between the voltage of the signal line before the first pixel outputs the second signal to the signal line and the voltage of the signal line before the second pixel outputs the second signal to the signal line.

SUMMARY OF THE INVENTION

According to an aspect of the present invention, a photoelectric conversion apparatus includes a plurality of photoelectric conversion portions each configured to generate an electric charge based on incident light, an output portion configured to output an optical signal based on the electric charge, a processing unit including an input node and configured to perform processing to generate an output signal corresponding to a voltage of the input node, and a control unit, wherein the output portion outputs a first signal based on the electric charge of some photoelectric conversion portions among the plurality of photoelectric conversion portions, and the input node is changed from a predetermined voltage to a first voltage corresponding to the first signal, wherein after the first signal is output, the output portion outputs a second signal based on the electric charges of the plurality of photoelectric conversion portions, and the input node changes to a second voltage corresponding to the second signal, and wherein the control unit changes the voltage of the input node from the first voltage toward the predetermined voltage during a predetermined time period after the voltage of the input node changes to the first voltage and before the voltage of the input node changes to the second voltage.

According to another aspect of the present invention, a method of driving a photoelectric conversion apparatus that includes a plurality of photoelectric conversion portions each configured to generate an electric charge based on incident light, an output portion configured to output a signal based on the electric charge, and a processing unit including an input node, to which the signal is input, and configured to process the signal, includes outputting a first signal based on the electric charge of some photoelectric conversion portions among the plurality of photoelectric conversion portions from the output portion so that a voltage of the input node is changed from a predetermined voltage to a first voltage corresponding to the first signal, changing the voltage of the input node from the first voltage toward the predetermined voltage, and outputting a second signal based on the electric charges of the plurality of photoelectric conversion portions from the output portion so that the voltage of the input node is changed to a second voltage corresponding to the second signal, wherein the outputting of the first signal, the changing, and the outputting of the second signal are performed in this order.

Further features of the present invention will become apparent from the following description of exemplary embodiments with reference to the attached drawings.

BRIEF DESCRIPTION OF THE DRAWINGS

FIGS. 5A and 5B are timing charts illustrating an operation of the photoelectric conversion apparatus.

DESCRIPTION OF THE EMBODIMENTS

The technique discussed in Japanese Patent Application Laid-Open No. 2016-219993 sometimes causes a difference in signal accuracy between a second signal of a first pixel and a second signal of a second pixel.

Each exemplary embodiment described below relates to a photoelectric conversion apparatus and a method of controlling a photoelectric conversion apparatus capable of reducing a difference in signal accuracy between second signals regardless of a difference between signal output operations of pixels.

Various exemplary embodiments will be described below with reference to the drawings.

In the exemplary embodiments described below, an image capturing apparatus will mainly be described as an example of a photoelectric conversion apparatus. Forms of each exemplary embodiment are not limited to image capturing apparatuses, and each exemplary embodiment is also applicable to other examples of a photoelectric conversion apparatus, such as a distance measurement apparatus (an apparatus that measures a distance using focal point detection or time of flight (TOF)), and a photometric apparatus (an apparatus that measures an amount of incident light).

Figure 1:
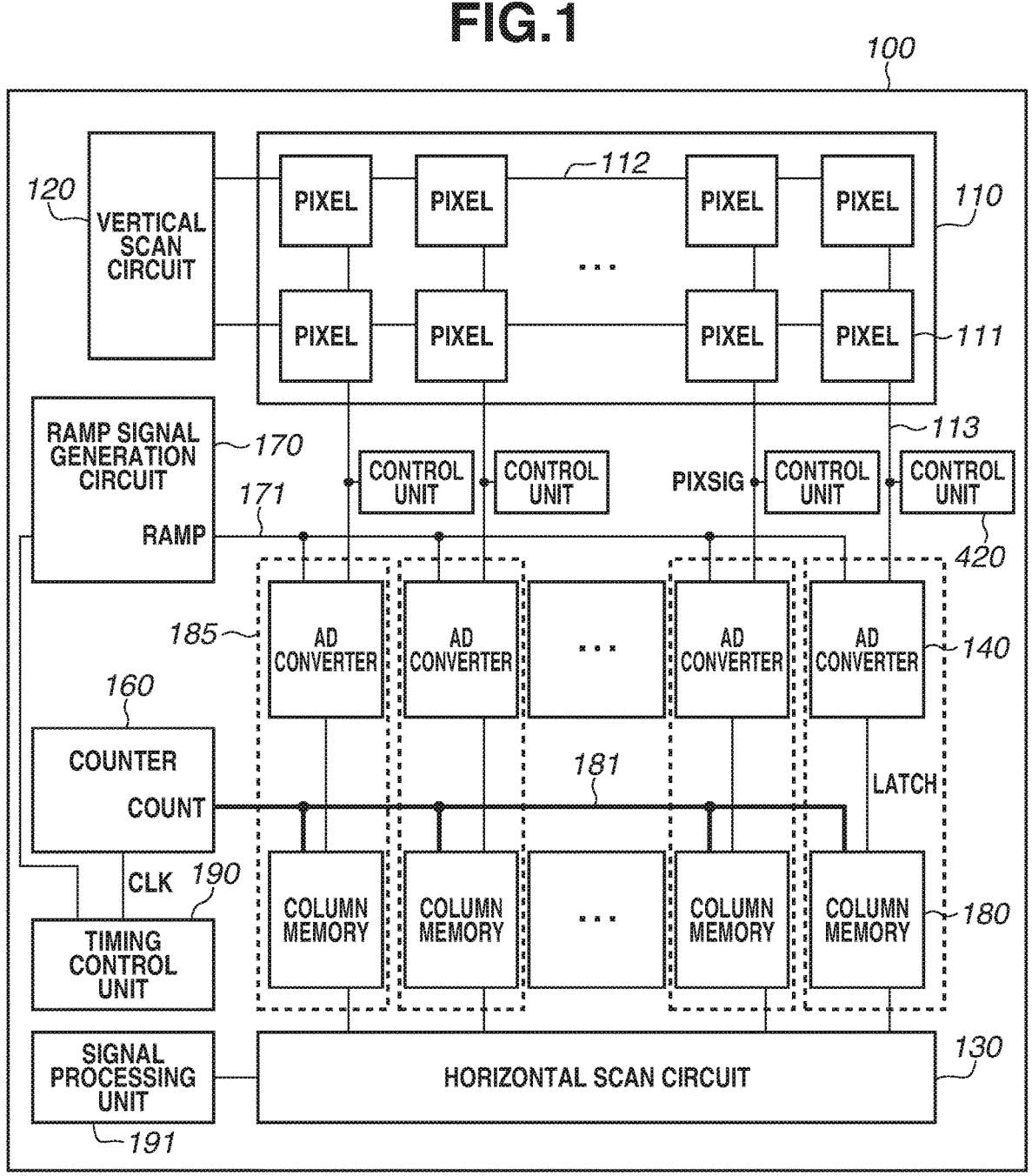
FIG. 1 is a block diagram illustrating a configuration of a photoelectric conversion apparatus.

FIG. 1 is a block diagram illustrating an example of a configuration of an image capturing apparatus 100 according to a first exemplary embodiment.

The image capturing apparatus 100 includes a pixel array 110, a vertical scan circuit 120, a horizontal scan circuit 130, an analog-digital (AD) converter 140, a counter 160, a ramp signal generation circuit 170, a timing control unit 190, and a signal processing unit 191.

The AD converter 140 and a column memory 180 are included in a processing unit 185. Each of the plurality of processing units 185 is configured to correspond to a column of a pixel 111.

The pixel array 110 includes the pixels 111 arranged in a plurality of rows and a plurality of columns. While two rows of pixels 111 are illustrated in FIG. 1, the number of rows of pixels 111 is not limited to two. In general, in a complementary metal-oxide semiconductor (CMOS) transistor image sensor as an example of an image capturing apparatus, several thousands of rows and several thousands of columns of the pixels 111 are arranged.

The image capturing apparatus 100 includes a row control line group 112, a signal line 113, and a count signal line 181. The plurality of pixels 111 is two-dimensionally arranged in rows and columns in the pixel array 110.

The vertical scan circuit 120 is electrically connected row by row to the plurality of pixels 111 via the plurality of row control line groups 112. One row control line group 112 is commonly provided with respect to each row of pixels 111. The vertical scan circuit 120 is electrically connected to the timing control unit 190.

The vertical scan circuit 120 controls the pixels 111 row by row based on a signal supplied from the timing control unit 190. The pixels 111 on a pixel row that is selected by the vertical scan circuit 120 output a signal PIXSIG to the signal line 113. Each of a plurality of signal lines 113 is connected to a plurality of pixels 111 on a column corresponding to the each signal line 113.

The ramp signal generation circuit 170 generates a ramp signal RAMP, and supplies the generated ramp signal RAMP to the plurality of AD converters 140 via a ramp signal line 171. The ramp signal generation circuit 170 starts changing a signal level of the ramp signal RAMP with time, based on a signal supplied from the timing control unit 190.

The image capturing apparatus 100 includes column circuits that are respectively arranged correspondingly to the columns of the pixels 111. The column circuits are described below.

Each column circuit includes the processing unit 185 and a control unit 420. Other than the processing unit 185, the column circuit can further include a correlated double sampling (CDS) circuit, and an amplification circuit before the processing unit 185. The processing unit 185 includes the AD converter 140 and the column memory 180.

The control unit 420 controls a voltage at an input node of the processing unit 185.

Each of the plurality of AD converters 140 is electrically connected to a corresponding one of the plurality of column memories 180.

Each of the plurality of AD converters 140 outputs a comparison result signal LATCH to the corresponding column memory 180. The comparison result signal LATCH indicates a result of a comparison between the signal PIXSIG supplied from the pixel 111 of the corresponding column and the ramp signal RAMP.

The counter 160 generates a count signal COUNT, which indicates a count of a clock signal CLK supplied from the timing control unit 190. The counter 160 supplies the generated count signal COUNT to the plurality of column memories 180 via the count signal line 181.

The count signal COUNT is a digital signal having a plurality of bits. The count signal line 181 typically includes a plurality of bit lines that transmits 1-bit signals, and parallelly transmits the respective bit signals of the count signal COUNT.

The horizontal scan circuit 130 sequentially selects the plurality of column memories 180. The column memory 180 selected by the horizontal scan circuit 130 outputs a digital signal corresponding to a voltage of the signal PIXSIG to the signal processing unit 191.

The signal processing unit 191 performs various types of processing, such as correction, amplification, and level shifting, on the digital signal input from the column memory 180, and outputs the resulting signal to the outside of the image capturing apparatus 100.

Figure 2:
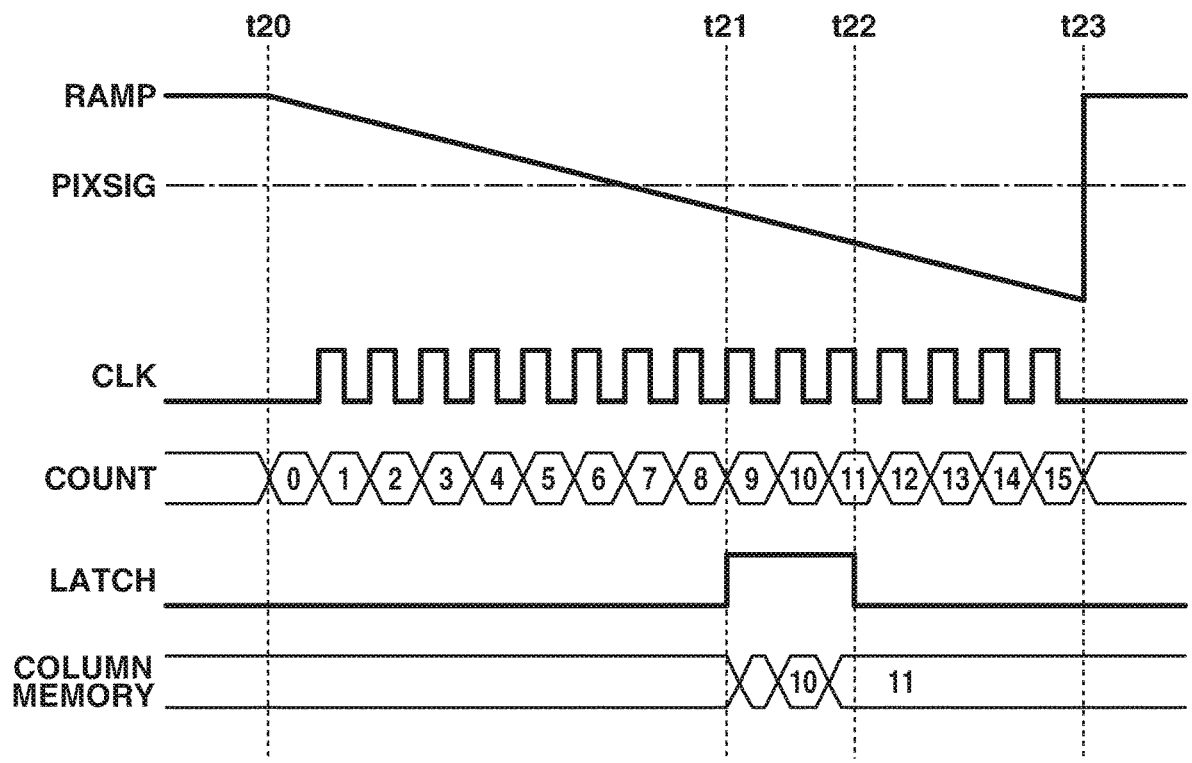
FIG. 2 is a timing chart illustrating an operation of the photoelectric conversion apparatus.

FIG. 2 is a timing chart illustrating an operation (driving) of the image capturing apparatus 100 illustrated in FIG. 1.

Signals illustrated in FIG. 2 respectively correspond to the signals illustrated in FIG. 1. FIG. 2 is a timing chart illustrating the driving in a case where the image capturing apparatus 100 generates a digital signal based on incident light as a normal operation. The signal COUNT is, for example, a 5-bit digital signal.

The term "column memory" refers to a digital signal that is held by the column memory 180. While the signal COUNT and the signal held by the column memory 180 are each a binary digital signal, these signals are each expressed as a decimal number in FIG. 2 for ease of description. Each signal expressed as a decimal number is actually a signal that is expressed as a 5-bit Gray code.

At time t20, the pixel 111, which is electrically connected to the row control line group 112 that is at a high level, outputs the signal PIXSIG to the signal line 113 based on incident light. At time t20, the ramp signal generation circuit 170 starts changing the signal level of the ramp signal RAMP with time, the ramp signal generation circuit 170 being controlled by the timing control unit 190. Further, at time t20, the counter 160 starts counting pulses of the signal CLK supplied from the timing control unit 190.

At time t21, the magnitude relationship between the signal level of the signal PIXSIG output from the pixel 111 to the signal line 113 and the signal level of the ramp signal RAMP is reversed, so that the AD converter 140 changes the signal level of the signal LATCH from a low level to a high level. At time t22, which is a predetermined period of time (e.g., 2.5 periods of the clock signal CLK) after time t21, the AD converter 140 changes the signal level of the signal LATCH from a high level to a low level.

The column memory 180 holds a value of the signal COUNT at time t22, which is a time at which the signal level of the signal LATCH is changed from a high level to a low level. Each of the plurality of column memories 180 is a memory that holds a digital signal based on an analog signal of the signal PIXSIG. A signal value of the digital signal held by the column memory 180 is a value of the count signal based on the time period from time t20, at which the signal level of the ramp signal RAMP starts changing, to time t22, at which the comparison result signal LATCH of the AD converter 140 is changed to a low level.

Each of the plurality of column memories 180 stores the count signal COUNT based on the time period from time t20, at which the signal level of the ramp signal RAMP starts changing, to time t21 or t22, at which the signal level of the comparison result signal LATCH of the plurality of AD converters 140 changes.

At time t23, the ramp signal generation circuit 170 stops changing the signal level of the ramp signal RAMP with time. Thereafter, the horizontal scan circuit 130 sequentially scans the plurality of column memories 180. Consequently, the digital signals respectively held by the plurality of column memories 180 are sequentially output to the signal processing unit 191.

Figure 3:
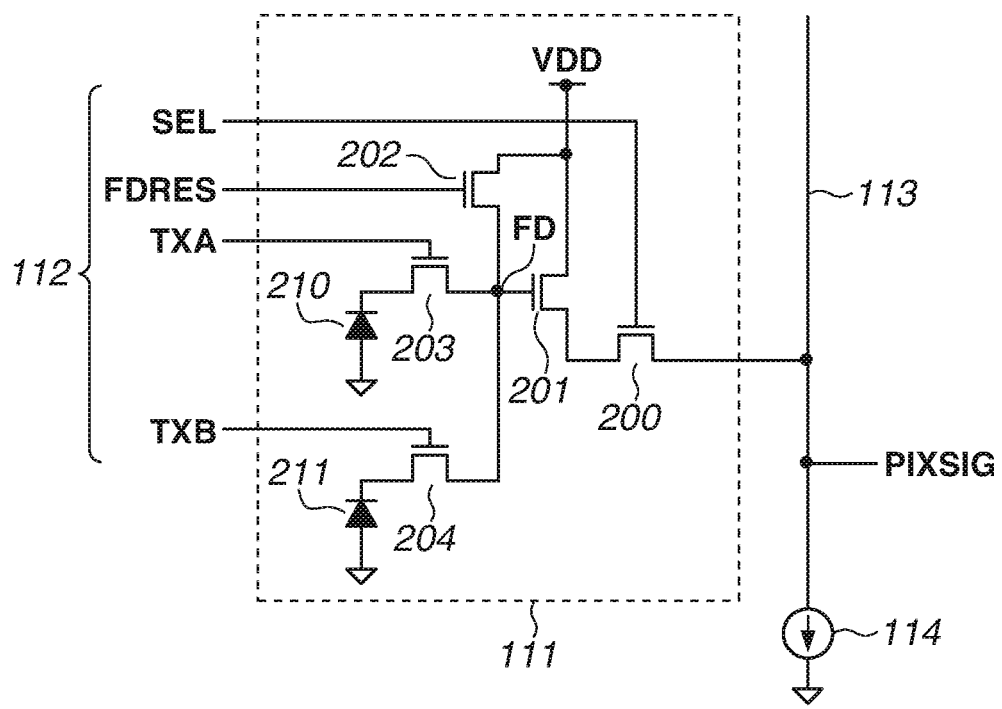
FIG. 3 illustrates a pixel configuration.

FIG. 3 illustrates an example of a configuration of the pixel 111. The pixel 111 includes a selection metal-oxide semiconductor (selection MOS) transistor 200, an amplification metal-oxide semiconductor (amplification MOS) transistor 201, a reset metal-oxide semiconductor (reset MOS) transistor 202, and transfer metal-oxide semiconductor (transfer MOS) transistors 203 and 204. The pixel 111 further includes a photodiode a210 (hereinafter, referred to as a "PDa 210") and a photodiode b211 (hereinafter, referred to as a "PDb 211"). The row control line group 112 and the signal line 113 are connected to the pixel 111. Further, signals SEL, FDRES, TXA, and TXB are input via the row control line group 112. The signal line 113 is connected to an electric current source 114. The signal PIXSIG as a pixel output is output to the AD converter 140.

The signal line 113 is connected to a source (one main node) of the selection MOS transistor 200. Further, a source of the amplification MOS transistor 201 is connected to a drain (another main node) of the selection MOS transistor 200. The signal SEL is input to a gate (control node) of the selection MOS transistor 200. The amplification MOS transistor 201 has a source connected to a power source VDD and a gate connected to a floating diffusion portion (FD portion). The reset MOS transistor 202 has a source connected to the power source VDD and a drain connected to the FD portion. The signal FDRES is input to a gate of the reset MOS transistor 202. The transfer MOS transistor 203 has a source connected to the PD portion and a drain connected to the PDa 210. The signal TXA is input to a gate of the transfer MOS transistor 203. The transfer MOS transistor 204 has a source connected to the FD portion and a drain connected to the PDb 211. The signal TXB is input to a gate of the transfer MOS transistor 204. The amplification MOS transistor 201 is an output portion that outputs a signal based on an electric potential of the FD portion to the signal line 113. The amplification MOS transistor 201 performs a source follower operation using an electric current supplied from an electric current source (not illustrated) connected to the signal line 113 and a voltage VDD connected to the drain.

Figure 4:
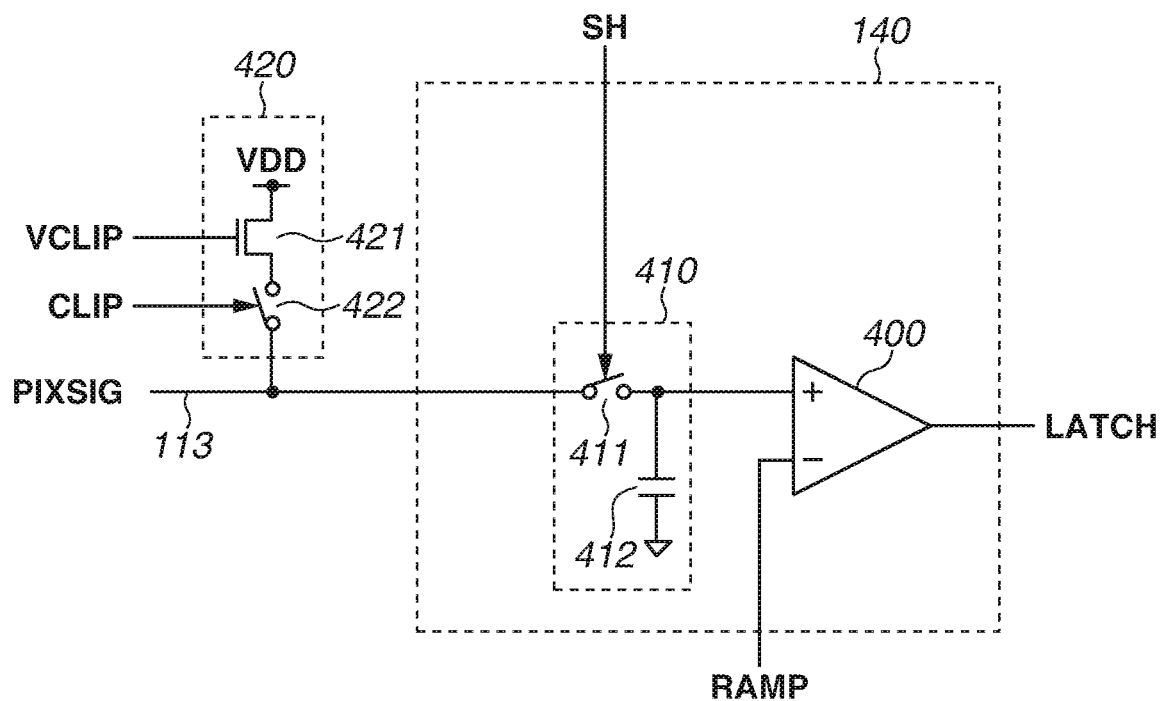
FIG. 4 illustrates a configuration of a control unit and an analog-digital (AD) converter.

FIG. 4 illustrates an example of a configuration of the AD converter 140. The AD converter 140 includes a comparator 400, a sample/hold (hereinafter, referred to as "S/H") circuit 410, and the control unit 420. In the present exemplary embodiment, the AD converter 140 holds the signal PIXSIG. Alternatively, the AD converter 140 may not hold the signal PIXSIG. In this case, the S/H circuit 410 is not required.

An input node of the AD converter 140 illustrated in FIG. 4 is an input node of the S/H circuit 410. The input node of the AD converter 140 is also the input node of the processing unit 185 illustrated in FIG. 1.

The comparator 400 compares the output of the S/H circuit 410 with the signal RAMP, and outputs a result of the comparison as the signal LATCH.

The S/H circuit 410 includes a switch 411 and a holding capacitance 412.

The switch 411 has an input terminal connected to the signal line 113 and an output terminal connected to the holding capacitance 412 and an input terminal of the comparator 400, and a signal SH is input to a control terminal of the switch 411. The signal SH is generated by the timing control unit 190. One terminal of the holding capacitance 412 is grounded. The S/H circuit 410 is a holding circuit that holds a voltage of the input node of the processing unit 185.

The control unit 420 includes a clip MOS transistor 421 and a switch 422. As long as the control unit 420 can perform a clip operation to limit an amplitude of the signal PIXSIG to a predetermined range, the configuration of the control unit 420 is not limited to this configuration. The clip MOS transistor 421 has a drain connected to the power source VDD and a source connected to an input terminal of the switch 422. Further, a voltage VCLIP, which is a control voltage, is input to a gate of the clip MOS transistor 421. The voltage VCLIP can be input from the outside or can be generated in the image capturing apparatus 100. The signal line 113 is connected to an output terminal of the switch 422, and a signal CLIP is input to a control terminal of the switch 422. The signal CLIP is generated by the timing control unit 190. In the control unit 420, the switch 422 is turned on when the signal CLIP is high, and the signal line 113 is clipped to the voltage VCLIP. The switch 422 is a switch that controls electrical connection between the clip MOS transistor 421, which is a voltage supply unit, and the input node of the processing unit 185. For ease of description, a voltage drop in the clip MOS transistor 421 based on a threshold voltage is neglectable in the present exemplary embodiment.

In the present exemplary embodiment, the control unit 420 controls a voltage of the input node of the processing unit 185 (the input node of the AD converter 140).

Figure 5B:
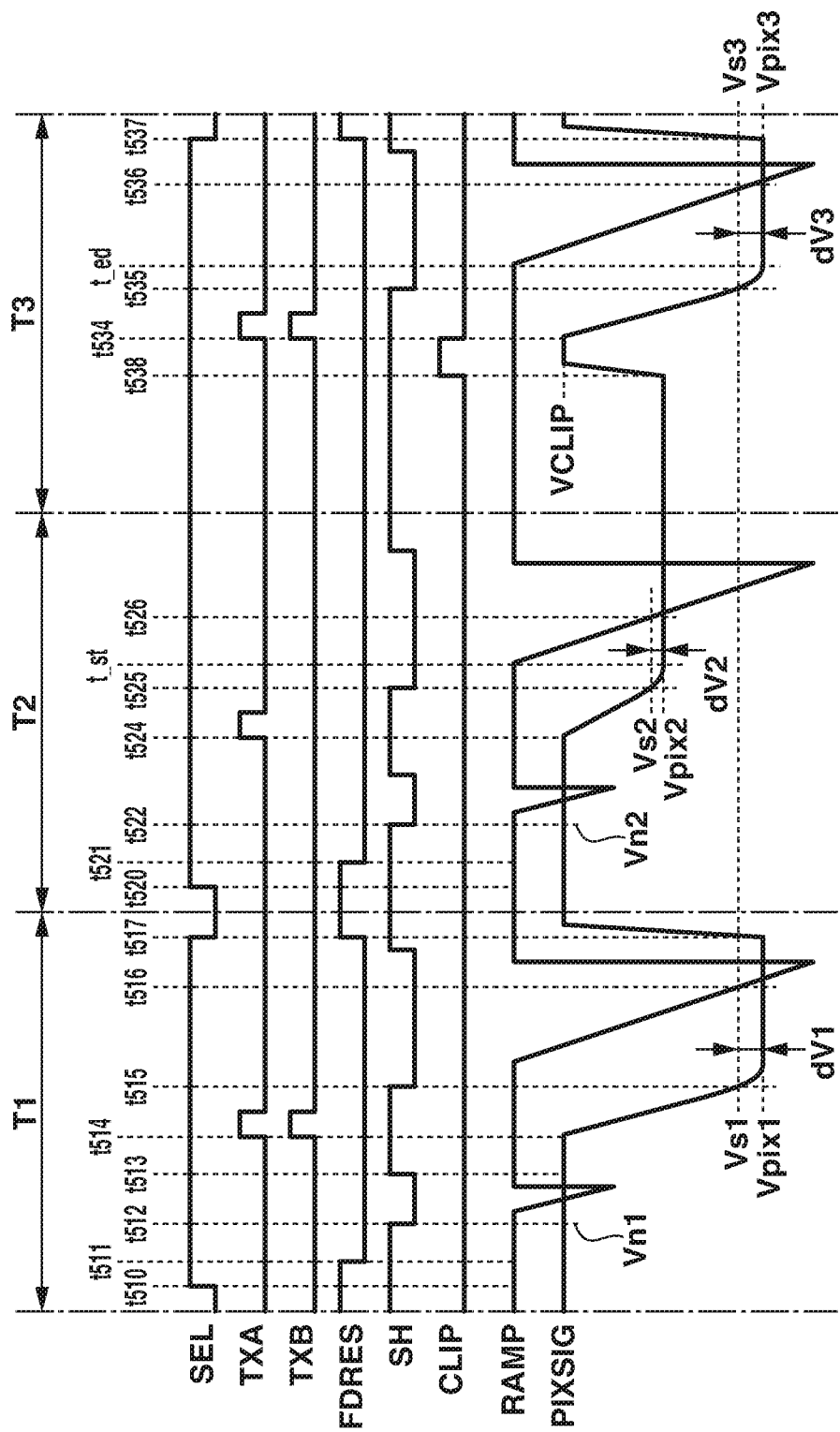

Next, operations of the pixel 111 in FIG. 3 and the AD converter 140 in FIG. 4 will be described with reference to FIGS. 5A and 5B. Signals illustrated in FIGS. 5A and 5B correspond to the signals illustrated in FIGS. 3 and 4, respectively. FIG. 5A is a timing chart illustrating details of an operation of the AD converter 140 in a case where the signal CLIP is not used. FIG. 5B is a timing chart illustrating details of an operation of the AD converter 140 in a case where the signal CLIP is used. In FIGS. 5A and 5B, an operation of two rows of pixels 111 is illustrated. An operation during a time period T1 is an operation for the pixels 111 in a first row, and operations during time periods T2 and T3 are operations for the pixels 111 in a second row.

First, FIG. 5A will be described.

The time period T1 illustrates an operation related to the pixel 111 that does not output a focal point detection signal but outputs a signal for image forming. The time periods T2 and T3 illustrate an operation related to the pixel 111 that outputs a signal for focal point detection.

First, the time period T1 will be described.

At time t510, the vertical scan circuit 120 changes the signal SEL to be supplied to a pixel row to high. Consequently, the selection MOS transistor 200 of the pixel row is turned on.

At time t511, the vertical scan circuit 120 changes the signal FDRES to a low level. Consequently, the reset MOS transistor 202 is turned off, and the resetting of the FD portion is cancelled.

At time t512, the timing control unit 190 changes the signal SH to a low level. Consequently, the S/H circuit 410 holds a voltage Vn1, which is a reset level of the signal PIXSIG. Thereafter, the voltage Vn1 is compared with the signal RAMP, and the above-described AD conversion operation is performed. This AD conversion is referred to as "N conversion".

At time t513, the timing control unit 190 changes the signal SH to a high level. Consequently, the S/H circuit 410 performs sampling of the signal PIXSIG.

At time t514, the vertical scan circuit 120 changes the signals TXA and TXB to a high level. Consequently, the transfer MOS transistors 203 and 204 are turned on. Electric charges of the PDa 210 and the PDb 211 are transferred to the FD portion. Consequently, a voltage of the FD portion is changed to a voltage that corresponds to the amount of transferred electric charges. The signal PIXSIG is thereby changed from the voltage Vn1 toward a voltage Vpix1. The voltage Vpix1 is an output level of the amplification MOS transistor 201 that corresponds to the voltage of the PD portion.

At time t515, the timing control unit 190 changes the signal SH to a low level. Consequently, the S/H circuit 410 holds a voltage Vs1.

The timing to change the signal SH to a low level by the timing control unit 190 may be determined based on a required frame rate (number of images captured per second) of the image capturing apparatus. If the frame rate is increased, it becomes difficult for the S/H circuit 410 to wait until the signal PIXSIG is settled to the voltage Vpix1. Thus, as illustrated in FIG. 5A, the voltage Vs1, which is a voltage of the signal PIXSIG before the signal PIXSIG is settled to the voltage Vpix1, is held. As a result, an AD conversion error corresponding to an error voltage dV1, which is equal to Vpix1−Vs1, occurs.

Thereafter, the comparator 400 of the AD converter 140 compares the voltage Vs1 with the signal RAMP.

At time t516, the magnitude relationship between the voltage Vs1 and the signal RAMP is reversed. The signal level of the signal LATCH output from the comparator 400 is thereby changed, and thus the column memory 180 holds a digital signal that corresponds to the voltage Vs1. This AD conversion is referred to as "S conversion".

At time t517, the vertical scan circuit 120 changes the signal SEL to a low level, and changes the signal FDRES to a high level. Further, the timing control unit 190 changes the signal SH to a high level. Then, the AD conversion of the pixel row that is selected at time t510 ends.

Next, operations during the time periods T2 and T3 will be described, mainly for a difference from the operations during the time period T1.

The operations performed from time t520 to immediately before time t524 in the time period T2 are similar to the operations performed from time t510 to time t514 in the time period T1.

At time t524, the vertical scan circuit 120 changes the signal TXA to a high level while keeping the signal TXB at a low level. Consequently, the electric charge of the PDb 211 is not transferred to the FD portion, and the electric charge of the PDa 210 is transferred to the FD portion.

As a result, the FD portion is changed to a voltage that corresponds to the amount of transferred electric charges. Consequently, the signal PIXSIG is changed from the voltage Vn1 toward a voltage Vpix2, which is a first voltage. The voltage Vpix2 is an output level of the amplification MOS transistor 201 that corresponds to the voltage of the FD portion.

At time t525, the timing control unit 190 changes the signal SH to a low level. Consequently, the S/H circuit 410 holds a voltage Vs2. At time t525, an error voltage dV2, which is equal to Vpix2−Vs2, occurs as in the time period T1.

Thereafter, the comparator 400 of the AD converter 140 compares the voltage Vs2 with the signal RAMP.

At time t526, the magnitude relationship between the voltage Vs2 and the signal RAMP is reversed. Consequently, the signal level of the signal LATCH output from the comparator 400 is changed, and the column memory 180 holds a digital signal that corresponds to the voltage Vs2.

Thereafter, the timing control unit 190 changes the signal SH to a high level. Consequently, the S/H circuit 410 performs sampling of the signal PIXSIG again.

At time t534, the vertical scan circuit 120 changes the signals TXA and TXB to a high level. Consequently, the electric charges of the PDa 210 and the PDb 211 are transferred to the FD portion. The PD portion holds the electric charge that is transferred caused by the signal TXA changed to a high level at time t524. Thus, the following electric charges are added in the FD portion: the electric charge that has been transferred as a result that the signal TXA is changed to a high level at time t524, and the electric charges that has been transferred as a result that the signals TXA and TXB are changed to a high level at time t534. In other words, the PD portion holds the electric charge that is the sum of the electric charges of the plurality of photoelectric conversion portions.

The FD portion accordingly changes the voltage thereof to a voltage that corresponds to the amount of transferred electric charges. Consequently, the signal PIXSIG is changed from the voltage Vpix2 toward a voltage Vpix3, which is a second voltage. The voltage Vpix3 is an output level of the amplification MOS transistor 201 that corresponds to the voltage of the FD portion.

At time t535, the timing control unit 190 changes the signal SH to a low level. Consequently, the S/H circuit 410 holds a voltage Vs3. At time t535, an error voltage dV3, which is equal to Vpix3−Vs3, occurs as in the time period T1.

The operations thereafter are similar to the operations performed after time t515 in the time period T1.

Consequently, the column memory 180 holds a digital signal that corresponds to the voltage Vs3.

An issue that arises during the operations illustrated in FIG. 5A will be described.

First, the error voltages above will be described. Suppose that Vpix1=Vpix3=1 V, and Vpix2=0.5 V. Further, the S/H circuit 410 holds the signal PIXSIG at a timing when 99% of the voltage change of the signal PIXSIG is completed. In this case, Vs1 and Vs2 become 0.99 V and 0.495 V, respectively. Thus, dV1 and dV2 become 0.01 V and 0.005 V, respectively.

Meanwhile, the voltage Vs3 is changed to Vpix3 after the signal PIXSIG is settled to the voltage Vpix2. The voltage Vs3 satisfies the following formula:

$$Vs3 = Vpix2 + 0.495\ V = 0.995\ V.$$

Thus, dV3 becomes 0.005 V.

Further, dV4, which is a difference between dV1 and dV3, becomes 0.005 V. This dV4 is an error that occurs depending on whether the voltage of the signal PIXSIG is the signal Vn1 or Vpix2 before a signal obtained by adding the electric charges of the plurality of photoelectric conversion portions has been read. Specifically, a signal based on the electric charge obtained by adding the electric charges of the plurality of photoelectric conversion portions is read from a pixel 111 while a signal based on an electric charge of a photoelectric conversion portion among the plurality of photoelectric conversion portions and the signal based on the electric charge obtained by adding the electric charges of the plurality of photoelectric conversion portions are read from another pixel 111. The error is caused by the difference between the signal reading operations of the pixels 111.

In the example illustrated in FIG. 5A, a signal that is read during the time period T3 is greater in amplitude than a signal that is read during the time period T1. Thus, a pixel row that is read during the time period T3 is displayed with a higher luminance than that of a pixel row that is read during the time period T1. Consequently, transverse streaks are formed on an image.

FIG. 5B is a timing chart illustrating an operation of the image capturing apparatus 100 according to the present exemplary embodiment. The operation illustrated in FIG. 5B is different from the operation illustrated in FIG. 5A in that the signal CLIP is kept at a high level by the timing control unit 190 during the time period from time t538 to time t534. A predetermined time period that is after the voltage of the input node of the processing unit 185 is changed to the voltage Vpix2, which is the first voltage, and before the voltage of the input node of the processing unit 185 is changed to the voltage Vpix3, which is the second voltage, is the time period from time t_st to time t_ed in FIG. 5B. During the predetermined time period, the control unit 420, which is a control unit, changes the voltage of the input node of the processing unit 185 from the first voltage toward a predetermined voltage. As an example of this operation, in FIG. 5B, the signal CLIP is at a high level from time t538 to t534, so that the signal PIXSIG is increased to the voltage VCLIP. The signal VCLIP herein is the same voltage as the signal Vn1, which is a noise-level signal.

By the above-described operations, the voltage of the signal PIXSIG before the electric charge obtained by adding the electric charges of the plurality of photoelectric conversion portions is read is brought to a voltage that corresponds to the signal Vn1 regardless of whether an electric charge of some photoelectric conversion portions among the plurality of photoelectric conversion portions is read. Consequently, the error dV4 that occurs as illustrated in FIG. 5A is reduced. Thus, transverse streaks are less likely to be formed on an image.

In the present exemplary embodiment, the signal VCLIP has the same voltage as the signal Vn1 does. This is not a limiting example, and the voltage of the signal PIXSIG can be changed from the signal Vpix2 toward the signal Vn1, which is the predetermined voltage. This predetermined voltage is not limited to the signal Vn1. The predetermined voltage can be a reset voltage of the signal line 113.

While the control unit 420 does not operate during a time period other than the time period from time t538 to t534 in FIG. 5B, the control unit 420 can be configured to operate as an amplitude limitation circuit that limits a variable range of the signal PIXSIG to a predetermined range. The signal CLIP is brought to a high level during the time period from time t511 to time t512 and the time period from time t521 to time t522. The variable range of the signal PIXSIG is thereby limited to a range (range less than or equal to the first voltage) from the signal Vn1 to the signal VCLIP. Thus, even when strong light enters the PDa 210 and the PDb 211 and an electric charge leaks into the FD portion, the amplitude of the signal PIXSIG can still be limited. In a case where the amplitude is not limited, the digital signal of the N conversion has a large value, so that a low-luminance signal is obtained as a result of subtraction processing on the digital signal of the N conversion using the digital signal of the S conversion. Thus, the pixel 111 where the strong light enters is processed as a low-luminance pixel. Consequently, an image that fails to reflect the correct luminance of a subject is generated. Hereinafter, this phenomenon will be referred to as "high-luminance/darkening phenomenon". If the control unit 420 performs the amplitude limitation, the high-luminance/darkening phenomenon is reduced.

The control unit 420 can be configured so that another voltage is further input to the control unit 420 to thereby limit the amplitudes of the voltages Vpix2 and Vpix3. For example, a voltage of a lower limit value (a maximum of the amplitudes) of the voltages Vpix2 and Vpix3 can be input as the signal VCLIP.

The operations of the two rows of pixels 111 have been described with reference to FIG. 5B. An actual model of the image capturing apparatus 100 in general includes more pixel rows. During a time period from when the vertical scan circuit 120 selects a pixel row to when the vertical scan circuit 120 re-selects the pixel row, the pixels 111 of a pixel row perform the operation during the time period T1 described in FIG. 5B. The pixels 111 of another pixel row can perform the operations during the time periods T2 and T3 described in FIG. 5B. The time period from when the vertical scan circuit 120 selects a pixel row to when the vertical scan circuit 120 re-selects the pixel row can also be considered as a time period for generating signals for use in one image. This time period is sometimes referred to as "one-frame time period".

While each pixel 111 includes two photodiodes in the present exemplary embodiment, more than two photodiodes can be included. For example, in a case where each pixel 111 includes four photodiodes, any of the photodiodes can be selected to add electric charges of the selected photodiodes. Further, after a signal based on an electric charge of only one photodiode is read, each of a signal based on an electric charge obtained by adding electric charges of two photodiodes and a signal based on an electric charge obtained by adding electric charges of four photodiodes can be read. In this case, it is desirable that the control unit 420 should perform voltage control to bring the signal CLIP to a high level before the signal based on the electric charge obtained by adding the electric charges of the two photodiodes is read and also before the signal based on the electric charge obtained by adding the electric charges of the four photodiodes is read.

In the present exemplary embodiment, an electric charge obtained by adding electric charges of a plurality of photodiodes included in one pixel 111 is acquired. In another example, each pixel 111 includes one photodiode, and an electric charge obtained by adding electric charges of the plurality of photodiodes included in the plurality of pixels 111 can be acquired. Even in this case, the operations according to the present exemplary embodiment are applicable. In this case, electric charges of the pixels 111 of a plurality of rows can be added, or electric charges of the pixels 111 of a plurality of columns can be added.

Further, "a signal based on electric charges of a plurality of photoelectric conversion portions" can be generated by a method different from the above-described method of adding electric charges. In another example, the selection MOS transistors 200 of the pixels 111 of a plurality of rows connected to one signal line 113 are changed to an operation state in parallel. Consequently, a signal obtained by averaging signals of the pixels 111 of a plurality of rows appears on the signal line 113. Such a signal obtained by averaging signals of the pixels 111 of the plurality of rows is also "a signal based on electric charges of a plurality of photoelectric conversion portions".

Figure 6A:
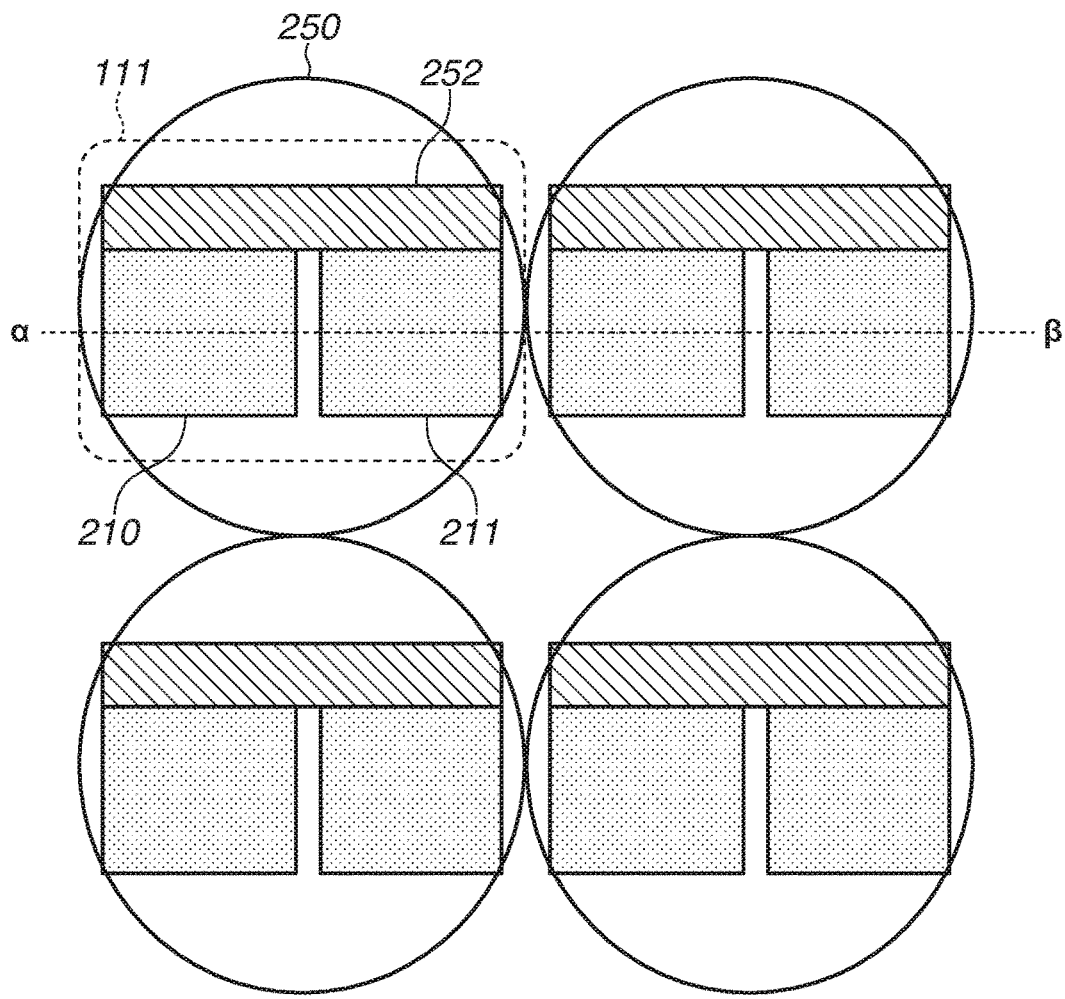
FIGS. 6A and 6B illustrate a pixel layout.
Figure 6B:
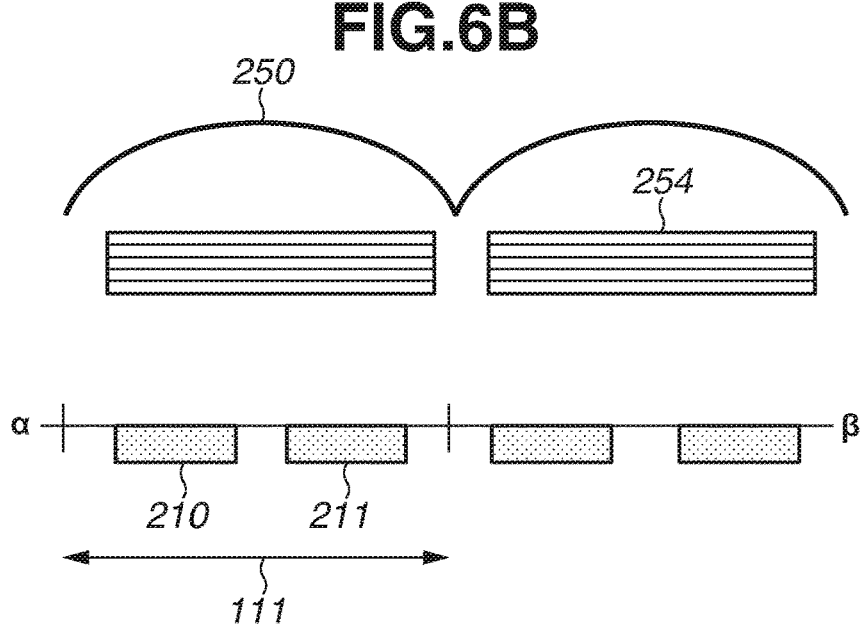

The pixels 111 according to the present exemplary embodiment can be configured, such that a plurality of photoelectric conversion portions is arranged with respect to one microlens as illustrated in FIGS. 6A and 6B. FIG. 6A is a top view illustrating the pixels 111. Each pixel 111 includes a pixel circuit portion 252. Various transistors of the pixel 111 are arranged on the pixel circuit portion 252. A microlens 250 is disposed to correspond to the PDa 210 and the PDb 211. FIG. 6B is a cross-sectional view illustrating a position along line α-β marked in FIG. 6A. Light having transmitted through the microlens 250 and a color filter 254 enters the PDa 210 and the PDb 211. The color filter 254 is typically a filter that corresponds to one of red, green, and blue but can be a filter that corresponds to another color or can be a white filter (filterless).

With this configuration, a focal point detection operation of an image plane phase-difference method is executable. Specifically, the digital signal that is generated by the S conversion during the time period T2 is used as a signal A for focal point detection. The digital signal generated by the S conversion during the time period T1 and the digital signal generated by the S conversion during the time period T3 are used as signals for image forming. Further, a signal B for focal point detection is acquired by subtraction processing using the digital signal generated by the S conversion during the time period T3 and the digital signal generated by the S conversion during the time period T2. Focal point detection can be performed using the signals A and B for focal point detection.

While the image capturing apparatus according to the present exemplary embodiment is illustrated in FIG. 6A as a front-side illuminated image capturing apparatus, the image capturing apparatus according to the present exemplary embodiment can be a rear-side illuminated image capturing apparatus.

In a second exemplary embodiment, another configuration of a control unit that controls a voltage of an input node of a processing unit will be described.

Figure 7:
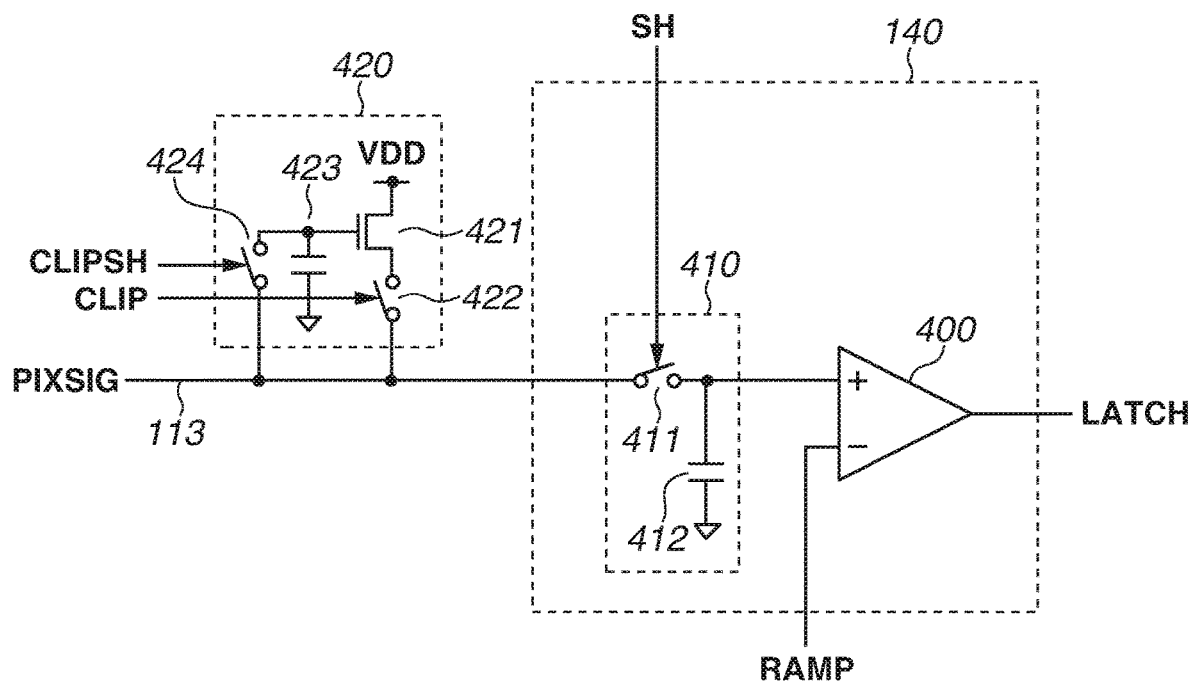
FIG. 7 illustrates a configuration of a control unit and an AD converter.

FIG. 7 illustrates a configuration of a column circuit according to the present exemplary embodiment.

A control unit 420 according to the present exemplary embodiment includes a clip MOS transistor 421, a switch 422, a holding capacitance 423, and a switch 424. A power source voltage VDD is supplied to a drain of the clip MOS transistor 421, and an input terminal of the switch 422 is connected to a source of the clip MOS transistor 421. The holding capacitance 423 and an output terminal of the switch 424 are connected to a gate of the clip MOS transistor 421.

The signal line 113 is connected to an output terminal of the switch 422, and the signal CLIP is input to the control terminal of the switch 422. The signal CLIP is input from the timing control unit 190.

One terminal of the holding capacitance 423 is connected to a power source voltage GND. The power source voltage GND is a ground voltage.

The signal line 113 is connected to the output terminal of the switch 424, and the signal CLIPSH is input to a control terminal of the switch 424. The switch 424 is turned on when the signal CLIPSH is at a high level, and the holding capacitance 423 samples the signal PIXSIG. The switch 424 is turned on when the signal CLIPSH is at a low level, and the holding capacitance 423 holds the signal PIXSIG. Although not illustrated, the signal CLIPSH can be changed to a high level and a low level between time t521 and time t522 in FIG. 5B. Consequently, the holding capacitance 423 holds a voltage Vn2.

The control unit 420 turns on the switch 422 when the signal CLIP is at a high level. At this time, the signal PIXSIG is limited to an amplitude less than or equal to the voltage Vn2. Consequently, a signal range (dynamic range) of the signal PIXSIG for the signals (optical signals) based on the electric charges accumulated by the photoelectric conversion portions is increased, compared to the configuration of the control unit 420 according to the first exemplary embodiment. Thus, the dynamic range for the optical signals is acquired while the high-luminance/darkening phenomenon is reduced.

An image capturing apparatus according to a third exemplary embodiment will be described, mainly for a difference from the first exemplary embodiment.

Figure 8:
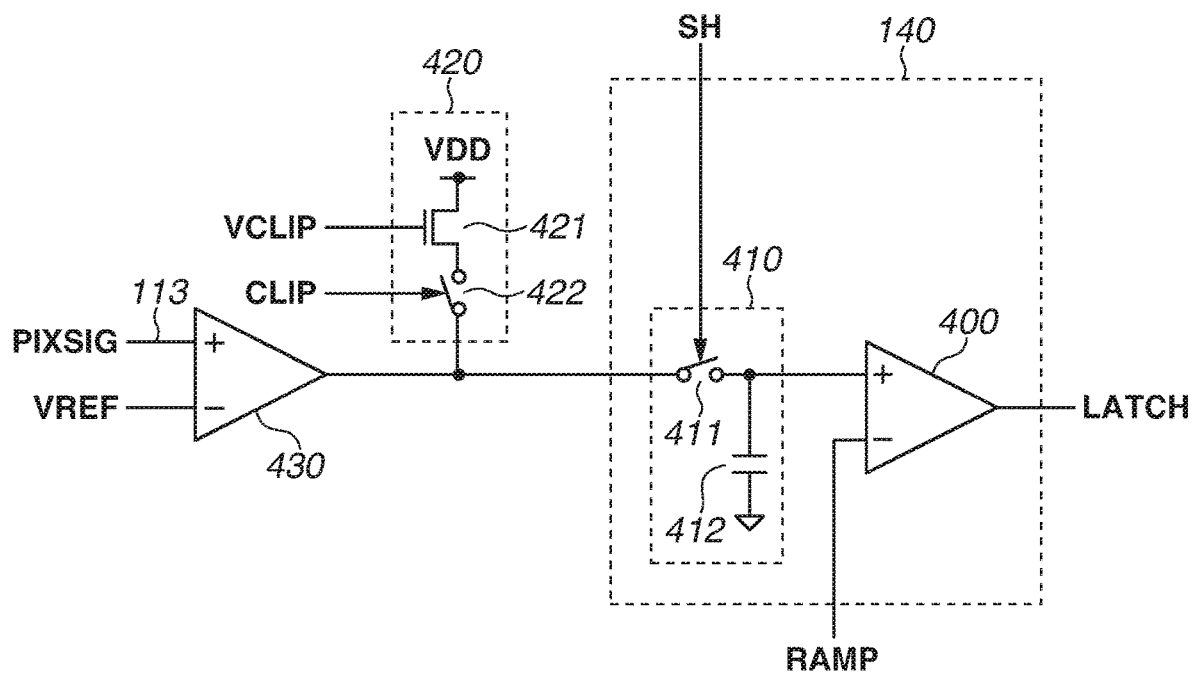
FIG. 8 illustrates a configuration of a control unit and an AD converter.

FIG. 8 illustrates a configuration of a column circuit of the image capturing apparatus according to the present exemplary embodiment.

The image capturing apparatus according to the present exemplary embodiment includes an amplification circuit 430 (amplification unit). The amplification circuit 430 is situated before the S/H circuit 410 and after the pixel 111. The amplification circuit 430 outputs an amplification signal generated by amplifying the signal PIXSIG. The control unit 420 is connected to an electric path between an output node of the amplification circuit 430 and the input node of the processing unit 185. The rest of the configuration is similar to that included in the first exemplary embodiment.

The control unit 420 is different from the first exemplary embodiment in that the control unit 420 limits the amplitude of an output signal of the amplification circuit 430. In general, an amplification circuit with a higher gain requires a longer time period for an output signal to be settled. Thus, if a high gain is set to the amplification circuit 430, the AD conversion error described above in the first exemplary embodiment increases.

In the present exemplary embodiment, the control unit 420 performs the operations for a time period between time t538 and time t534 in FIG. 5B according to the first exemplary embodiment. Thus, although the length of time needed for the output signal to be settled is increased caused by the amplification circuit 430, the AD conversion error can be small.

Further, the operations for a time period between time t538 and time t534 by the control unit 420 can be set such that the operations are not performed when the gain of the amplification circuit 430 is low and the operations are performed when the gain of the amplification circuit 430 is high. The control unit 420 may have a similar configuration to that described above in the second exemplary embodiment.

Figure 9:
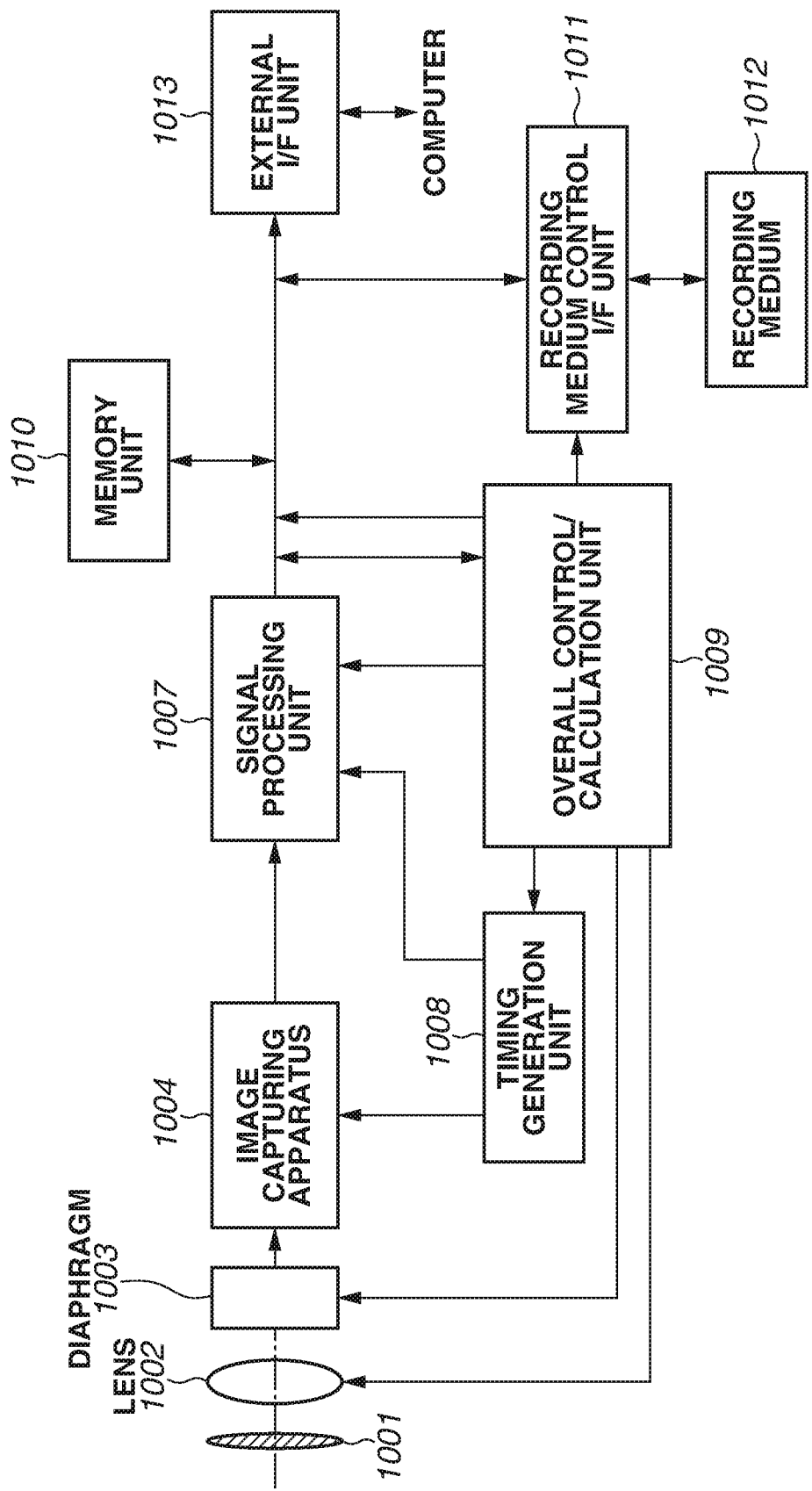
FIG. 9 is a block diagram illustrating a configuration of a photoelectric conversion system.

A photoelectric conversion system according to a fourth exemplary embodiment will be described with reference to FIG. 9. FIG. 9 is a block diagram illustrating a schematic configuration of the photoelectric conversion system according to the present exemplary embodiment.

The image capturing apparatus 100 according to any one of the first to third exemplary embodiments is applicable to various photoelectric conversion systems. Examples of applicable photoelectric conversion systems include digital still cameras, digital camcorders, monitoring cameras, copying machines, facsimile machines, mobile phones, in-vehicle cameras, and observation satellites. Further, a camera module that includes an optical system, such as a lens, and an image capturing apparatus is also an example of the photoelectric conversion systems. FIG. 9 is a block diagram illustrating a digital still camera as an example.

A photoelectric conversion system illustrated as an example in FIG. 9 includes an image capturing apparatus 1004, a lens 1002, a diaphragm 1003, and a barrier 1001. The lens 1002 forms an optical image of a subject on the image capturing apparatus 1004. The diaphragm 1003 varies the amount of light that passes through the lens 1002. The barrier 1001 protects the lens 1002. The lens 1002 and the diaphragm 1003 are an optical system that focuses light on the image capturing apparatus 1004. The image capturing apparatus 1004 is an image capturing apparatus 100 according to any one of the above-described exemplary embodiments. The image capturing apparatus 1004 converts an optical image formed by the lens 1002 into image data.

The photoelectric conversion system further includes a signal processing unit 1007 configured to process an output signal that is output from the image capturing apparatus 1004. The signal processing unit 1007 performs AD conversion to convert an analog signal that is output from the image capturing apparatus 1004 into a digital signal. The signal processing unit 1007 performs various types of correction and compression as needed and outputs image data. An AD conversion unit of the signal processing unit 1007 can be formed on a semiconductor substrate on which the image capturing apparatus 1004 is disposed. The AD conversion unit can also be formed on another semiconductor substrate that is different from the semiconductor substrate on which the image capturing apparatus 1004 is disposed. The image capturing apparatus 1004 and the signal processing unit 1007 may be formed on a same semiconductor substrate.

The photoelectric conversion system further includes a memory unit 1010 and an external interface unit (external I/F unit) 1013. The memory unit 1010 temporarily stores image data. The external I/F unit 1013 communicates with an external computer. The photoelectric conversion system further includes a recording medium 1012, such as a semiconductor memory, and a recording medium control interface unit (recording medium control I/F unit) 1011. The recording medium 1012 is for recording or reading captured data. The recording medium control I/F unit 1011 records or reads data to or from the recording medium 1012. The recording medium 1012 can be built in the photoelectric conversion system or can be removable.

The photoelectric conversion system further includes an overall control/calculation unit 1009 and a timing generation unit 1008. The overall control/calculation unit 1009 controls various calculations and the entire digital still camera. The timing generation unit 1008 outputs various timing signals to the image capturing apparatus 1004 and the signal processing unit 1007. The timing signal can be input from the outside, and the photoelectric conversion system is to include at least the image capturing apparatus 1004 and the signal processing unit 1007, which processes an output signal that is output from the image capturing apparatus 1004.

The image capturing apparatus 1004 outputs a captured signal to the signal processing unit 1007. The signal processing unit 1007 performs predetermined signal processing on the captured signal output from the image capturing apparatus 1004, and outputs image data. The signal processing unit 1007 generates an image using the captured signal.

As described above, the present exemplary embodiment realizes the photoelectric conversion system to which the image capturing apparatus 100 according to any one of the above-described exemplary embodiments is applied.

Figure 10A:
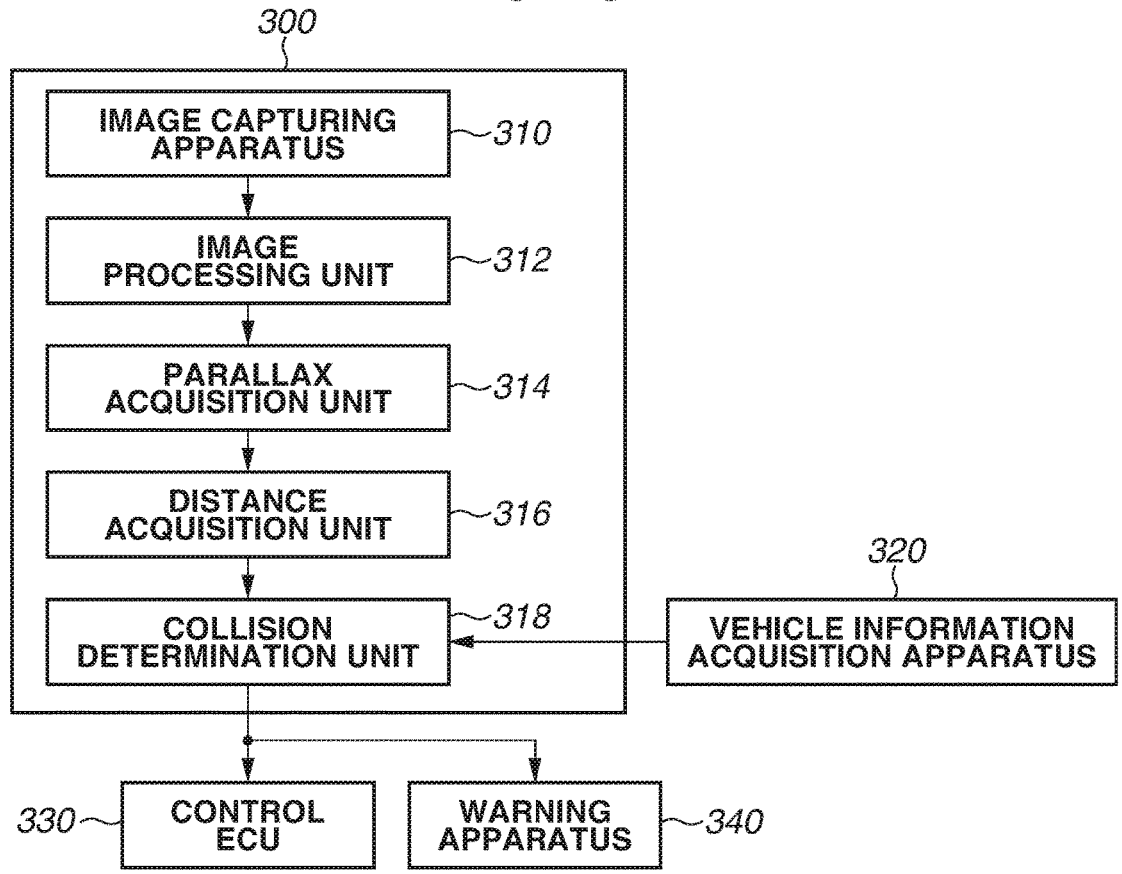
FIG. 10A is a block diagram illustrating a configuration of a photoelectric conversion system.
Figure 10B:
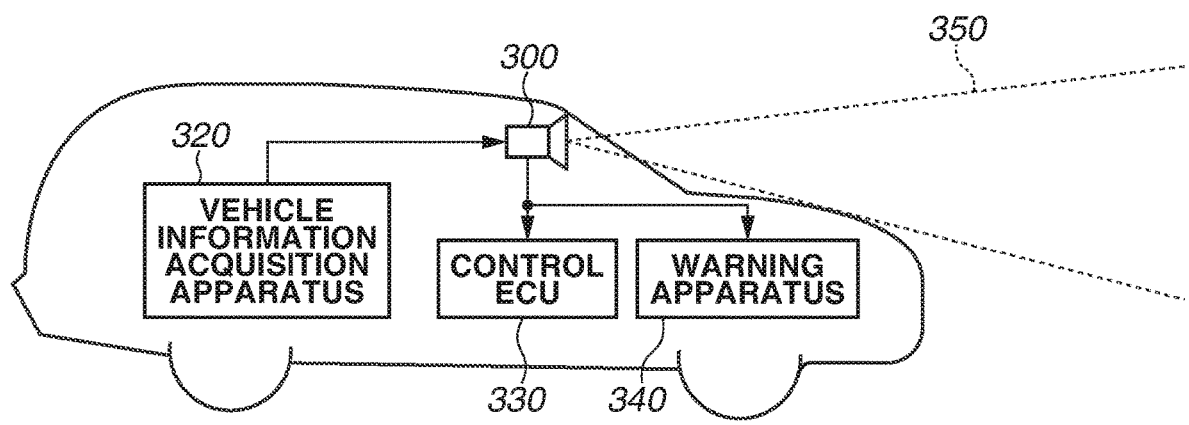
FIG. 10B is a block diagram illustrating a configuration of a moving body.

A photoelectric conversion system and a moving body according to a fifth exemplary embodiment will be described with reference to FIGS. 10A and 10B. FIGS. 10A and 10B illustrate configurations of the photoelectric conversion system and the moving body according to the present exemplary embodiment.

FIG. 10A illustrates an example of a photoelectric conversion system that relates to an in-vehicle camera. A photoelectric conversion system 300 includes an image capturing apparatus 310. The image capturing apparatus 310 is the image capturing apparatus 100 according to any one of the above-described exemplary embodiments. The photoelectric conversion system 300 includes an image processing unit 312 and a parallax acquisition unit 314. The image processing unit 312 performs image processing on a plurality of pieces of image data acquired by the image capturing apparatus 310. The parallax acquisition unit 314 calculates a parallax (phase difference in parallax image) from a plurality of pieces of image data acquired by the photoelectric conversion system 300. The photoelectric conversion system 300 further includes a distance acquisition unit 316 and a collision determination unit 318. The distance acquisition unit 316 calculates a distance to a target object based on the calculated parallax. The collision determination unit 318 determines a possibility of collision based on the calculated distance. The parallax acquisition unit 314 and the distance acquisition unit 316 are an example of a distance information acquisition unit that acquires distance information about a distance to a target object. Specifically, the distance information is information about a parallax, a defocus amount, and a distance to a target object. The collision determination unit 1060 determines a possibility of collision using any of these pieces of distance information. The distance information acquisition unit is realized by dedicated hardware or a software module. The distance information acquisition unit is also realized by a field-programmable gate array (FPGA), an application-specific integrated circuit (ASIC), or a combination of the FPGA and the ASIC.

The photoelectric conversion system 300 is connected to a vehicle information acquisition apparatus 320. The photoelectric conversion system 300 acquires vehicle information such as a vehicle speed, yaw rate, and rudder angle. The photoelectric conversion system 300 is connected to a control engine control unit (ECU) 330. The control ECU 330 is a control apparatus configured to output a control signal that generates braking force with respect to the vehicle based on the result of determination by the collision determination unit 318. The photoelectric conversion system 300 is also connected to a warning apparatus 340. The warning apparatus 340 provides a warning to the driver based on the result of determination by the collision determination unit 318. For example, in a case where the collision determination unit 318 determines that the possibility of collision is high, the control ECU 330 controls the vehicle to avoid collision and prevent damage by applying a brake, releasing an accelerator, and/or reducing engine output. The warning apparatus 340 warns the user by producing a warning sound, displaying warning information on a screen of a car navigation system, and/or vibrating a seatbelt or a steering.

In the present exemplary embodiment, the photoelectric conversion system 300 captures an image of a position near the vehicle, e.g., the front or the back. FIG. 10B illustrates the photoelectric conversion system 300 that captures an image of the front of the vehicle (image capturing range 350). The vehicle information acquisition apparatus 320 transmits an instruction to the photoelectric conversion system 300 or the image capturing apparatus 310. With this configuration, accuracy of distance measurement is further increased.

While the control that is performed to avoid collision with another vehicle has been described above, the photoelectric conversion system 300 is also applicable to the control that is performed to automatically drive to follow another vehicle or the control that is performed to automatically drive not to drift from a lane. The photoelectric conversion system 300 is further applicable not only to a vehicle but also to a moving body (moving apparatus) such as a ship, an aircraft, or an industrial robot. The photoelectric conversion system 300 is also applicable not only to a moving body but also to a device that extensively uses object recognition, such as an intelligent transportation system (ITS).

The present invention is not limited to the above-described exemplary embodiments and various modifications can be made.

For example, an example in which a portion of a configuration according to any one of the above-described exemplary embodiments is added to another exemplary embodiment and an example in which a portion of a configuration according to any one of the above-described exemplary embodiments is replaced with a portion of a configuration according to another exemplary embodiment are also exemplary embodiments of the present invention.

The photoelectric conversion systems according to the fourth and fifth exemplary embodiments illustrate an example of a photoelectric conversion system to which a photoelectric conversion apparatus is applicable. However, the photoelectric conversion systems to which the photoelectric conversion apparatus according to any exemplary embodiment of the present invention is applicable are not limited to the configurations illustrated in FIGS. 9, 10A, and 10B.

It should be noted that the above-described exemplary embodiments are mere illustrations of an example of implementation of the present invention and are not intended to limit the technical scope of the present invention. That is to say, the present invention is implementable in various forms without departing from the technical concept or major features of the present invention.

The present invention provides a photoelectric conversion apparatus and a method of driving the photoelectric conversion apparatus, the photoelectric conversion apparatus being capable of reducing a difference in signal accuracy between second signals regardless of a difference between signal output operations of pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107370, filed Jun. 7, 2019, which is hereby incorporated by reference herein in its entirety.

What is claimed is:

1. A photoelectric conversion apparatus comprising:
a plurality of photoelectric conversion portions each configured to generate an electric charge based on incident light;
an output portion configured to output an optical signal based on the electric charge;
a processing unit including an input node and configured to perform processing to generate an output signal corresponding to a voltage of the input node; and
a control unit,
wherein the output portion outputs a first signal based on the electric charge of some photoelectric conversion portions among the plurality of photoelectric conversion portions, and the input node is changed from a predetermined voltage to a first voltage corresponding to the first signal,
wherein after the first signal is output, the output portion outputs a second signal based on the electric charges of the plurality of photoelectric conversion portions, and the input node changes to a second voltage corresponding to the second signal,
wherein the control unit changes the voltage of the input node from the first voltage toward the predetermined voltage during a predetermined time period after the voltage of the input node changes to the first voltage and before the voltage of the input node changes to the second voltage,
wherein the output portion outputs a third signal that is a noise-level signal, and
wherein the control unit limits a variable range of the voltage of the input node to a range less than or equal to the first voltage in a case where the output portion outputs the third signal.

2. The photoelectric conversion apparatus according to claim 1, wherein the control unit changes the voltage of the input node to the first voltage during the predetermined time period.

3. The photoelectric conversion apparatus according to claim 1, wherein the control unit changes the voltage of the input node to a voltage corresponding to a reset voltage of the input node during the predetermined time period.

4. The photoelectric conversion apparatus according to claim 1, wherein the control unit changes the voltage of the input node to the predetermined voltage during the predetermined time period.

5. The photoelectric conversion apparatus according to claim 1, wherein the control unit limits a variable range of the voltage of the input node in a case where the output portion outputs the second signal.

6. The photoelectric conversion apparatus according to claim 1, wherein the control unit limits a variable range of the voltage of the input node in a case where the output portion outputs the first signal.

7. The photoelectric conversion apparatus according to claim 1,
wherein the processing unit is an analog-digital (AD) converter,
wherein the AD converter generates a first digital signal corresponding to the first voltage, and
wherein the predetermined time period is a time period after the AD converter generates the first digital signal and before the voltage of the input node is changed to the second voltage.

8. The photoelectric conversion apparatus according to claim 1, further comprising a single microlens configured to cause the incident light to enter the plurality of photoelectric conversion portions.

9. A photoelectric conversion apparatus comprising:
a plurality of photoelectric conversion portions each configured to generate an electric charge based on incident light;
an output portion configured to output an optical signal based on the electric charge;
a processing unit including an input node and configured to perform processing to generate an output signal corresponding to a voltage of the input node;
a control unit; and a plurality of pixels each including the plurality of photoelectric conversion portions and the output portion, wherein the output portion outputs a first signal based on the electric charge of some photoelectric conversion portions among the plurality of photoelectric conversion portions, and the input node is changed from a predetermined voltage to a first voltage corresponding to the first signal, wherein after the first signal is output, the output portion outputs a second signal based on the electric charges of the plurality of photoelectric conversion portions, and the input node changes to a second voltage corresponding to the second signal, wherein the control unit changes the voltage of the input node from the first voltage toward the predetermined voltage during a predetermined time period after the voltage of the input node changes to the first voltage and before the voltage of the input node changes to the second voltage, wherein a first pixel among the plurality of pixels outputs the second signal, and wherein during a time period from when the first pixel outputs the second signal to when the first pixel outputs a next second signal, some pixels among the plurality of pixels output the first signal and the second signal, and some other pixels among the plurality of pixels do not output the first signal but output the second signal.

10. The photoelectric conversion apparatus according to claim 1, further comprising an amplification unit to which the signal is input from the output portion, the amplification unit including an output node configured to output an amplification signal generated by amplifying the signal to the input node, wherein the control unit is connected to an electric path between the output node and the input node.

11. The photoelectric conversion apparatus according to claim 1, wherein the control unit includes a voltage supply unit, and a switch configured to control electrical connection between the voltage supply unit and the input node, and wherein the switch is turned on during the predetermined time period so that the voltage of the input node is changed from the first voltage toward the predetermined voltage by a voltage supplied by the voltage supply unit.

12. The photoelectric conversion apparatus according to claim 11, wherein the voltage supply unit is a transistor, a power source voltage is supplied to a main node of the transistor, another main node of the transistor is connected to the switch, and a control voltage is input to a control node of the transistor.

13. The photoelectric conversion apparatus according to claim 12, further comprising a signal line connecting the output portion and the input node, wherein the control voltage is a voltage of the signal line.

14. A photoelectric conversion apparatus comprising:

a plurality of photoelectric conversion portions each configured to generate an electric charge based on incident light;

an output portion configured to output an optical signal based on the electric charge;

a processing unit including an input node and configured to perform processing to generate an output signal corresponding to a voltage of the input node;

a control unit; and a holding circuit configured to hold the voltage of the input node, wherein the output portion outputs a first signal based on the electric charge of some photoelectric conversion portions among the plurality of photoelectric conversion portions, and the input node is changed from a predetermined voltage to a first voltage corresponding to the first signal, wherein after the first signal is output, the output portion outputs a second signal based on the electric charges of the plurality of photoelectric conversion portions, and the input node changes to a second voltage corresponding to the second signal, wherein the control unit changes the voltage of the input node from the first voltage toward the predetermined voltage during a predetermined time period after the voltage of the input node changes to the first voltage and before the voltage of the input node changes to the second voltage, and wherein the processing unit performs processing to generate an output signal based on the voltage held by the holding circuit.

15. A photoelectric conversion system comprising:

the photoelectric conversion apparatus according to claim 1; and a signal processing unit configured to process a signal output from the photoelectric conversion apparatus.

16. A moving body comprising:

the photoelectric conversion apparatus according to claim 1;

a distance information acquisition unit configured to acquire distance information about a distance to a target object using a parallax image based on a signal from the photoelectric conversion apparatus; and a control unit configured to control the moving body based on the distance information.

17. The photoelectric conversion apparatus according to claim 1, further comprising a plurality of pixels each including the plurality of photoelectric conversion portions and the output portion, wherein a first pixel among the plurality of pixels outputs the second signal, and wherein during a time period from when the first pixel outputs the second signal to when the first pixel outputs a next second signal, some pixels among the plurality of pixels output the first signal and the second signal, and some other pixels among the plurality of pixels do not output the first signal but output the second signal.

18. The photoelectric conversion apparatus according to claim 1, further comprising a holding circuit configured to hold the voltage of the input node, wherein the processing unit performs processing to generate an output signal based on the voltage held by the holding circuit.

19. The photoelectric conversion apparatus according to claim 9, further comprising a holding circuit configured to hold the voltage of the input node, wherein the processing unit performs processing to generate an output signal based on the voltage held by the holding circuit.

20. A photoelectric conversion system comprising:

the photoelectric conversion apparatus according to claim 9; and a signal processing unit configured to process a signal output from the photoelectric conversion apparatus.

21. A moving body comprising:

the photoelectric conversion apparatus according to claim 9;

a distance information acquisition unit configured to acquire distance information about a distance to a target object using a parallax image based on a signal from the photoelectric conversion apparatus; and a control unit configured to control the moving body based on the distance information.

22. A photoelectric conversion system comprising:

the photoelectric conversion apparatus according to claim 14; and a signal processing unit configured to process a signal output from the photoelectric conversion apparatus.

23. A moving body comprising:

the photoelectric conversion apparatus according to claim 14;

a distance information acquisition unit configured to acquire distance information about a distance to a target object using a parallax image based on a signal from the photoelectric conversion apparatus; and a control unit configured to control the moving body based on the distance information.

* * * * *